United States Patent
Beck

(10) Patent No.: US 9,072,281 B2
(45) Date of Patent: Jul. 7, 2015

(54) METHOD AND DEVICE FOR DESTROYING PARASITES ON FISH

(75) Inventor: Esben Beck, Fjellhamar (NO)

(73) Assignee: STINGRAY MARINE SOLUTIONS AS, Oslo (NO)

( * ) Notice: Subject to any disclaimer, the term of this patent is extended or adjusted under 35 U.S.C. 154(b) by 412 days.

(21) Appl. No.: 13/577,402

(22) PCT Filed: Jan. 18, 2011

(86) PCT No.: PCT/NO2011/000021
§ 371 (c)(1),
(2), (4) Date: Oct. 23, 2012

(87) PCT Pub. No.: WO2011/115496
PCT Pub. Date: Sep. 22, 2011

(65) Prior Publication Data
US 2013/0050465 A1 Feb. 28, 2013

(30) Foreign Application Priority Data
Feb. 5, 2010 (NO) .................................. 20100190

(51) Int. Cl.
H04N 9/47 (2006.01)
A01K 61/00 (2006.01)

(52) U.S. Cl.
CPC .............. A01K 61/00 (2013.01); A01K 61/001 (2013.01)

(58) Field of Classification Search
CPC .................. G06T 7/0004; G06T 2207/30128; A01K 61/00
USPC ................. 382/103; 348/125, 192, 92, 89, 81
See application file for complete search history.

(56) References Cited

U.S. PATENT DOCUMENTS

| | | |
|---|---|---|
| 6,061,086 A | 5/2000 | Reimer et al. |
| 6,763,283 B1 | 7/2004 | Murakami |
| 2003/0060810 A1* | 3/2003 | Syrowicz et al. ............... 606/9 |
| 2003/0091075 A1* | 5/2003 | Tatsuta et al. ................... 372/36 |
| 2003/0098409 A1* | 5/2003 | Bond et al. ............... 250/223 R |
| 2005/0025357 A1 | 2/2005 | Landwehr et al. |
| 2008/0004750 A1* | 1/2008 | Ban et al. ........................ 700/245 |
| 2008/0033410 A1* | 2/2008 | Rastegar et al. ................ 606/9 |
| 2009/0003975 A1* | 1/2009 | Kuduvalli et al. ............. 414/146 |
| 2010/0186284 A1* | 7/2010 | Hyde et al. ..................... 43/132.1 |

FOREIGN PATENT DOCUMENTS

| | | | | |
|---|---|---|---|---|
| GB | 2 286 756 | 8/1995 | | |
| JP | 2007-252358 | 10/2007 | | |
| WO | WO 94/17657 | 8/1994 | | |
| WO | WO 9417657 A1 * | 8/1994 | ............. | A01K 61/00 |
| WO | WO 98/24304 | 6/1998 | | |

* cited by examiner

Primary Examiner — Sath V Perungavoor
Assistant Examiner — Fabio Lima
(74) Attorney, Agent, or Firm — Ladas & Parry LLP

(57) ABSTRACT

Device for destroying parasites on fish, such as salmon lice on salmon in fish farms, comprising a camera (4) communicating with a controlling unit (51) which in turn communicates with a light source (5) adapted to fire pulses of point shaped light which is harmful for the parasite in question. The controlling unit (51) controls a system for optical recognition within a defined coordinate system and is arranged to detect points and to update in real time coordinates that exhibits contrast differences typical for parasites on a fish surface and to trigger a light pulse from the light source (5) when the coordinates for at detected point coincides with the coordinates for the aiming point of the light source.

11 Claims, 3 Drawing Sheets

METHOD AND DEVICE FOR DESTROYING PARASITES ON FISH

BACKGROUND

Salmon lice are an increasing problem which lately has been given significant attention in the media. The problem has until now mostly been associated with farmed salmon. The present treatment methods have largely involved use of chemicals or additives to the fodder as well as some types of mechanical treatment in which the fish must be guided from the fish cages and thereafter guided to a clean fish cage after completed treatment. Chemicals and fodder additives are rather disputed and lice are becoming resistant against the chemicals used. Mechanical removal is costly and time consuming and it imposes undesired stress to the fish.

A particular problem associated with the fact that farmed salmon escape or otherwise come in contact with wild salmon has created a situation where also wild salmon is affected. The problem has become apparent in all countries having extensive salmon farming.

There is thus a need for new methods by which the treatment is performed in a gentle manner and in a way that reduce the need for chemicals.

OBJECTIVES

It is thus an object of the present invention to provide a method and/or an apparatus that allows effective treatment of colonies of fish being infested by parasites like salmon lice and the like.

It is a challenge to achieve said object with means which are not very expensive and which does not make use of chemicals that in the long term may lose its effect due to resistance.

THE INVENTION IN GENERAL

The objectives as mentioned above is achieved by the device according to the present invention as defined by claim 1.

According to another aspect the invention comprises a method as disclosed by claim 11.

Preferred embodiments of the invention are disclosed by the dependent claims.

It should be emphasized that when an "operational unit" is discussed in the following, this is a practical term of the mainly physical equipment comprising the device according to the invention. Since the term "operational unit" is not part of the definition of the invention, it does not need any more precise definition. Typically the operational unit encompasses a defined passage in which the coordinate system is established as well as camera, light source and equipment on which these are mounted.

Systems for automatic, optical recognition which constitutes a component of the present invention, is known from a number of connections within automation and robotics, e.g. U.S. Pat. No. 6,763,283 and U.S. Pat. No. 7,496,228.

DETAILED ABOUT THE INVENTION WITH REFERENCE TO DRAWINGS

By operational unit is understood a unit which is arranged to perform the actions involved in the process. In addition the device according to the present invention can comprise non-operational units, such as a buoy floating in the sea, separate buoyant bodies, means for attracting or forcing fish to move according to a predetermined pattern, as well as other peripheral equipment not related to the actual treatment.

Below the invention is described in further detail in the form of certain embodiments which are illustrated by drawings.

Figure 1:
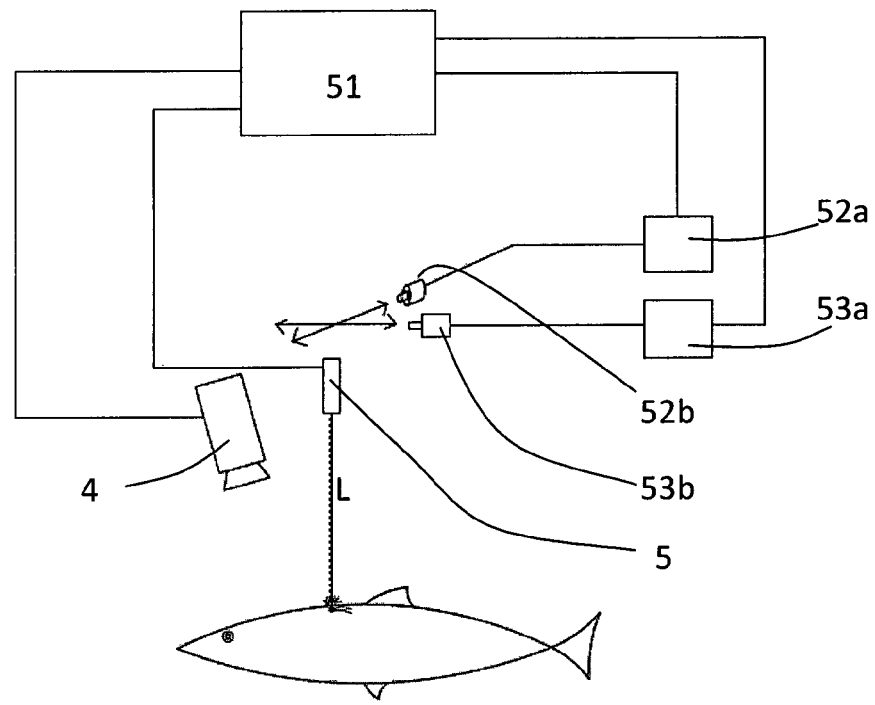
FIG. 1 shows schematically units included in an embodiment of the present invention.

FIG. 1 is a schematic view of the components of the device of the device according to the present invention, comprising camera 4, laser 5, controlling unit (CPU) 51, as well as non-mandatory elements in the form of servo controller for x coordinate 52a and corresponding motor 52b, as well as servo controller for y coordinate 53a with corresponding motor 53b. The light is illustrated with partially broken line L while continuous lines for communication between the other units are shown without numerals or letters.

Figure 2:
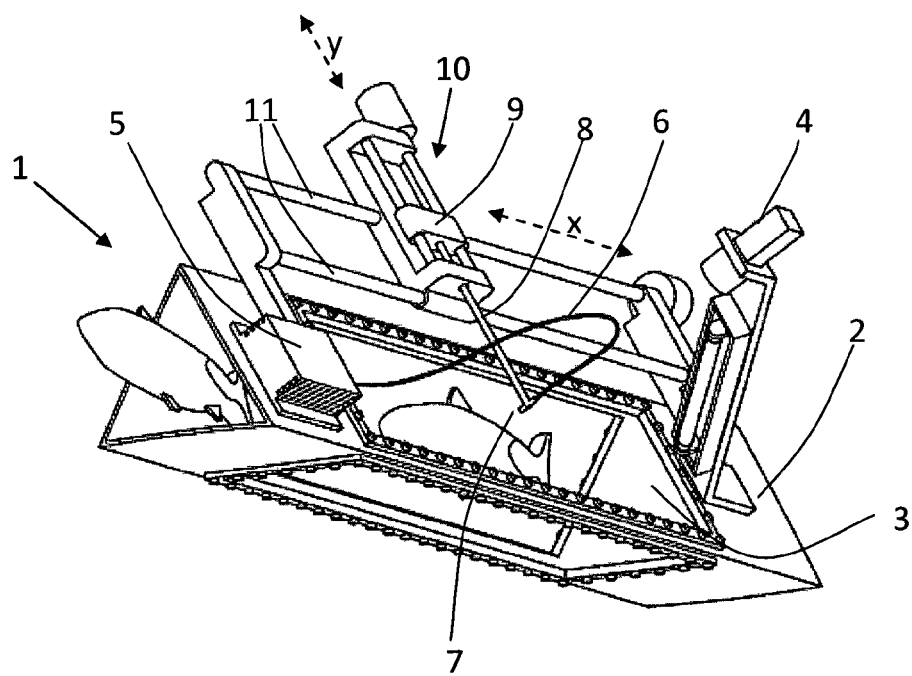
FIG. 2 is a view of an operational unit of the device according to the present invention.

FIG. 2 shows an operational unit 1 according to the invention, comprising a triangular pipe structure 2 having a window 3 at least on one side. Outside the window 3 a camera 4 connected to å image recognition system is arranged, the image recognition system having the form of a per se known computer software controlled by a logic controlling unit 51 (CPU). There is also a light source in the form of a laser unit 5 which via a flexible optical cable 6 can shoot light pulses from a light orifice 7 directed towards the window 3. The light orifice 7 of the optical cable 6 is held by an arm 8 on a rider 9 slidably arranged on a carriage 10 which in turn can slide on rails 11 along the window 3. The controlling unit 51 receives information from the camera 4 and transmits controlling pulses to the carriage 10. The controlling unit can define a coordinate system having an x axis along the window 3 and N Y axis across the window 3. Any point within this coordinate system can be reached by the light orifice 7 by moving the carriage 10 to desired x coordinate and by moving the rider 9 so that the light orifice is positioned at the desired y coordinate.

Camera 4 and controlling unit 51 can together identify fish coming in from one side and determine its speed with desired accuracy. The CPU can, based on this information, place the carriage immediately adjacent to, or shortly in front of the fish or the actual spot on the fish at which a parasite is observed, dependent upon the software and optionally the speed with which the fish is moving. In addition measures may be taken to reduce the speed with which the fish moves through the pipe system 2.

Camera and CPU analyze the image of the fish' surface, limited to the part of the fish facing the camera, with regard to whether there are points or areas with such a contrast that it indicates a parasite on the fish. In the cases when the CPU decides that a parasite sits on the fish, the light orifice is finely tuned accordingly and the laser unit 5 fires a light pulse of certain intensity and duration towards the parasite so it is killed or knocked out. This may take place with the carriage ay ease or in motion with a velocity mainly corresponding to the velocity with which the fish moves through the pipe system.

The exact positioning of the light orifice towards the desired spot on the fish can practically be achieved in different ways. A first step can be to find the exact x, y coordinates for the point at a certain point in time and from the velocity at which the fish moves, calculate a new set of coordinates at which the fish is expected at a later time, and to bring the light orifice to the calculated coordinates within the same point in time. If there is a deviation between the coordinates of the light orifice and the coordinates of the observed parasite, new calculations are performed according to the same principle followed by new adjustments of the carriage and the rider until the coordinates of the light orifice and real time observation of parasite are coinciding. At that point in time the CPU sends a signal to the laser unit 5 which generates a light pulse of desired intensity and duration.

In addition to using s number of discrete measurements, adaptation between the two sets of coordinates may be "smoothed" by early setting the carriage in motion with approximate the same speed as the velocity of the fish. New data could be sampled rapidly to determine any change in the speed of the fish along the x axis or movement along the y axis, while fish which is not stressed rarely change behaviour rapidly so the speed will typically be about the same for time intervals within a few seconds which will be typical intervals when using the present invention. Ideally the system is so quick that if a fish passes with more than one parasite, it will be quick enough to position light orifice 7 and send light pulses towards all observed parasites.

The point of tube and window is a dual one. The tube ensures that the fish' freedom of movement is somewhat limited so that it becomes easier to hit it with light pulses. Secondly it functions to establish a barrier between water and air so that most of the technical equipment can be positioned in dry air since it makes movement easier and reduces problems like corrosion and other undesired external effects. It is, however, also within the frame of the invention to arrange all of the equipment under water, in which case the limitation with a tube or the like is non-mandatory. It will still be convenient to use some form for guiding of the fish towards the site where the device can hit since it else will be too randomly and seldom fish will pass through a zone in which treatment is possible.

Figure 3:
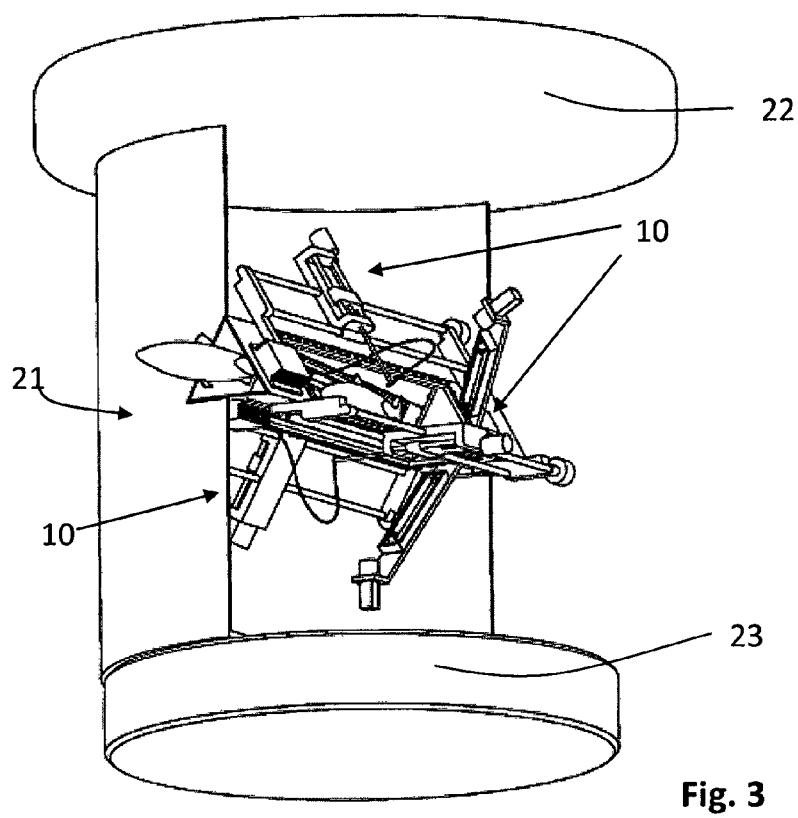
FIG. 3 is a variant of the embodiment shown in FIG. 2.

FIG. 3 shows a device of same type as shown in FIG. 2. In FIG. 3, however, a carriage 10 with corresponding camera and laser unit are shown at each of the three windows at each of the three sides of the tube. In such a case there will typically be three separate logic systems also, working independently of each other and illuminating the fish from all sides when passing through. FIG. 3 also shows how the device according to the invention can be arranged in a partly sectioned buoy 21 having an upper buoyant element 22 and a lower ballast element 23 contributing to hold the buoy in a mainly stable position in the water.

The buoy can be placed in a strategic location such that all fish that are allowed to move relatively freely, are guided to pass through the tube in question. The most obvious measure is to close, fully or partially, the passages which the fish might alternatively chose, either at the side of or beneath the buoy. Even if only one device is shown in the buoy of FIG. 3, it is obvious for a person skilled in the art that more than one device can be arranged in the same buoy, for instance to ore more at vertically different levels.

Figure 4:
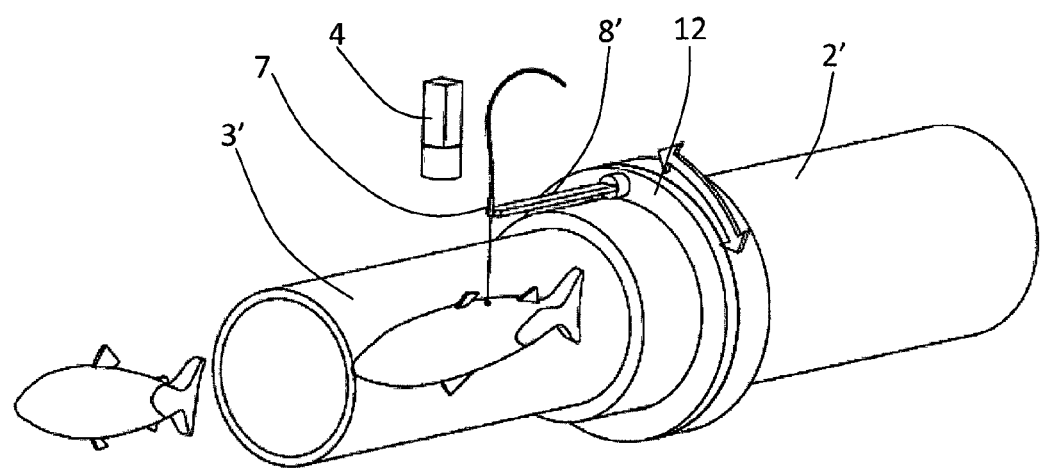
FIG. 4 is a view of an embodiment of an operational unit different from the one shown in FIGS. 2 and 3.

FIG. 4 shows an embodiment of the device according to the present invention where the passage through which the fish are brought to pass in order to be treated, has the shape of a tube 2' with a circular cross-section, with a least one section of the tube having the form of a transparent window 3'. In such a system one ore more cameras can be stationary arranged at one ore more locations along a periphery line in relation to the tube while a light orifice 7 is held by an arm 8' positioned on a ring 12 which is pivotal around the tube 2'. In this system it would not be natural to use a plane two-dimensional coordinate system but rather a coordinate system based on length and angle, more like a polar coordinate system. The denotation of the system is not important, however, but the fact that the camera(s) with corresponding "logic" is able to direct the light orifice 7 to a point which is directed to a point on a fish where a parasite is located within a time frame the fish uses to pass the tube window 3'.

Like the embodiment shown in FIG. 2, the arm 8' can be arranged so that the light orifice at all times is perpendicular to the window 3', which eliminates problems related to refraction of light when passing from air through glass and into liquid.

Figure 5:
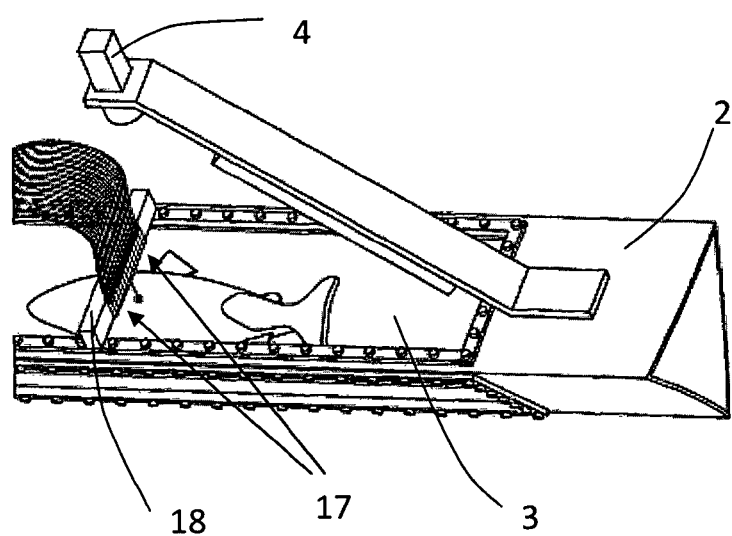
FIG. 5 is a view of still another embodiment of an operational unit according to the present invention.

FIG. 5 shows an embodiment which has the common feature with the embodiment of FIGS. 2 and 3 that a triangular tube profile is used having a window on at least one side and with the definition of a plane coordinate system mainly coinciding with the window 3. The difference is that instead of using a movable laser, a dense row of light orifices 17 is attached to a holder 18, said light orifices 17 being connected to one ore more laser units (not shown) via optical cables 16. The controlling system is arranged to generate a light pulse at desired point in time for the light orifice or orifices which best corresponds to the coordinates of one or more observed parasite(s) on a passing fish. This system has fewer mobile parts and can therefore be more robust but is more demanding with respect to the optical equipment.

With any one of the embodiments described above the aiming mechanism for the light source (laser) may use any known principle for aiming. Hereunder a point shaped indication light with a harmless intensity can be used having same direction as the more powerful or "surgical" pulse shaped light source. The triggering of the powerful light source can then be automatically activated when the indication light hits the localized parasite.

The powerful light source will typically be a laser but can in principle be any light source which may be focused to a point and having a wave length and intensity effectively to kill or render harmless the parasites in question.

Parasites in question can be any parasites on fish, but primary salmon lice.

While the system is primarily described for use in water, which is where live fish typically are, there is nothing preventing using the same system in situations where live fish are temporarily out of water, such as sliding over an inclined plane or in an open half-pipe from one container to a natural or artificial basin.

The illustrated embodiments are only for exemplification. Many other alternative configurations are possible. For instance the camera 4 can be movably arranged on the same arm as the light orifice 7. It is thereby ensured that the camera always has open view towards the coordinate system irrespective of where the light orifices are. The controlling unit 51 must in such a case naturally take into account the fact that the camera positions are dynamic and not stationary in the coordinate system.

The invention claimed is:

1. A device for destroying parasites on fish, comprising:
a camera arranged in communication with a controlling unit which in turn communicates with a light source arranged to emit pulses of focused light harmful for the parasite in question, the controlling unit controlling a system for optical recognition within a defined coordinate system and arranged to detect points and in real time to update coordinates of points showing contrast differences typical for parasites on fish in an aquatic environment, as well as to trigger a light pulse from the light source when the coordinates for such a detected point corresponds with the coordinates for the aiming point of the light source.

2. The device as claimed in claim 1, comprising a physical barrier that guides the fish to pass in a certain direction in relation to the coordinate system.

3. The device as claimed in claim 1, wherein the controlling unit is arranged to, by means of servo controllers and connected motors, actively move a light orifice for the light source in the direction of a detected point on a fish.

4. The device as claimed in claim 1, wherein the defined coordinate system is a two dimensional coordinate system, having an x-coordinate and a y-coordinate, against which a light orifice for the light source at all times is perpendicular.

5. The device as claimed in claim 4, wherein the light source comprises a number of light orifices arranged across the direction of movement for passing fish, along the y-axis of the coordinate system, and that the controlling unit is arranged to await the passing of a detected point on a fish and to trigger a light pulse to the light orifice that corresponds best with the y-coordinate of the detected point when the x coordinate for the point corresponds with the x coordinate of the light orifice.

6. The device as claimed in claim 1, wherein the defined coordinate system is a cylindrical coordinate system against which the light source at all times is perpendicular.

7. The device as claimed in claim 1, wherein the light source furthermore is provided with a harmless, point-shaped indication light which is arranged to continuously indicate the aim point of the pulse-shaped light in the coordinate system.

8. The device as claimed in claim 3, wherein the controlling unit is arranged to control servo controllers with the corresponding motors.

9. The device as claimed in claim 1, wherein the light source is a laser.

10. The device as claimed in claim 1, wherein the device comprises plural mutually independent operational units comprising camera, light source, coordinate system and corresponding controlling unit which independently covers different sides of fish passing through a defined area.

11. A method for destroying parasites on fish, comprising establishing at least one system for optical detection within a defined coordinate system, and to provide at least one light source with a harmful light for parasites, arranged to enable temporarily illuminating any point within the coordinate system, to adjust the system for optical detection to detect points that show contrast differences typical for parasites on fish in an aquatic environment, to transmit and in real time update the coordinates for such detected points to a controlling system for the light source when the real time updated coordinate for a detected point coincides with the coordinate of the aim point of the light source.

* * * * *